(12) United States Patent
Unnikrishnan et al.

(10) Patent No.: US 10,033,316 B2
(45) Date of Patent: Jul. 24, 2018

(54) SYSTEM AND METHOD FOR MODEL BASED TURBINE SHAFT POWER PREDICTOR

(71) Applicant: General Electric Company, Schenectady, NY (US)

(72) Inventors: Sunil Unnikrishnan, Hyderabad (IN); Karl Dean Minto, Greenville, SC (US); Omprakash Pobbati, Hyderabad (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/282,005

(22) Filed: Sep. 30, 2016

(65) Prior Publication Data

US 2018/0097463 A1   Apr. 5, 2018

(51) Int. Cl.
| | |
|---|---|
| *F02D 29/06* | (2006.01) |
| *H02P 9/04* | (2006.01) |
| *H02K 7/18* | (2006.01) |
| *F02C 9/26* | (2006.01) |
| *G05D 3/12* | (2006.01) |

(52) U.S. Cl.
CPC ............... *H02P 9/04* (2013.01); *F02C 9/26* (2013.01); *H02K 7/1823* (2013.01)

(58) Field of Classification Search
USPC ........................................ 290/40 C; 700/287
See application file for complete search history.

(56) References Cited

U.S. PATENT DOCUMENTS

| | | | | | |
|---|---|---|---|---|---|
| 3,919,623 | A | * | 11/1975 | Reuther | ........... F02C 9/26 290/4 R |
| 3,924,141 | A | * | 12/1975 | Yannone | ........... F02C 7/26 290/38 R |
| 4,308,463 | A | * | 12/1981 | Giras | ........... H02J 3/42 290/40 R |
| 4,504,905 | A | * | 3/1985 | Burrage | ........... F02C 9/46 700/2 |
| 6,269,627 | B1 | * | 8/2001 | Freese | ........... F02C 3/10 244/12.3 |
| 6,719,526 | B2 | * | 4/2004 | Sanborn | ........... F02C 9/00 415/118 |
| 7,007,487 | B2 | * | 3/2006 | Belokon | ........... F23C 9/00 60/39.27 |
| 7,051,535 | B2 | * | 5/2006 | Acker | ........... B64C 27/14 60/39.282 |
| 7,712,299 | B2 | * | 5/2010 | Wolflick | ........... F04D 25/04 60/39.091 |
| 8,381,507 | B2 | * | 2/2013 | Hannula | ........... F01D 21/06 60/39.281 |

(Continued)

*Primary Examiner* — Pedro J Cuevas
(74) *Attorney, Agent, or Firm* — Fletcher Yoder, P.C.

(57) ABSTRACT

In an embodiment, a control system includes a processor. The processor is configured to receive signals from one or more sensors disposed in a gas turbine system, wherein the gas turbine system comprises a shaft mechanically coupled to an electric generator. The processor is further configured to predict a derived mechanical power for the shaft based on the signals. The processor is additionally configured to derive a power adjustment by executing at least one model. The processor is also configured to derive a corrected mechanical power by applying the power adjustment to the derived mechanical power; and to control the gas turbine system based on the corrected mechanical power.

17 Claims, 4 Drawing Sheets

(56) References Cited

U.S. PATENT DOCUMENTS

| | | | | |
|---|---|---|---|---|
| 8,850,790 B2* | 10/2014 | McLeister | | F02C 9/54 60/39.23 |
| 9,404,426 B2* | 8/2016 | Wichmann | | F02C 9/50 |
| 9,878,692 B2* | 1/2018 | Cai | | B60T 7/12 |
| 2004/0037697 A1* | 2/2004 | Sanborn | | F02C 9/00 415/118 |
| 2004/0154385 A1* | 8/2004 | Acker | | B64C 27/14 73/112.01 |
| 2005/0022499 A1* | 2/2005 | Belokon | | F23C 9/00 60/39.511 |
| 2007/0055392 A1* | 3/2007 | D'Amato | | G05B 13/048 700/44 |
| 2007/0245707 A1* | 10/2007 | Pashley | | F02C 9/26 60/39.27 |
| 2008/0056910 A1* | 3/2008 | Wolflick | | F04D 25/04 417/1 |
| 2012/0117974 A1* | 5/2012 | Hilgeman | | F02C 6/06 60/772 |
| 2012/0285174 A1* | 11/2012 | Hannula | | F01D 21/06 60/773 |
| 2013/0019606 A1* | 1/2013 | McLeister | | F02C 9/54 60/773 |
| 2015/0081121 A1* | 3/2015 | Morgan | | F01D 21/003 700/287 |
| 2015/0142188 A1* | 5/2015 | Terry | | G05B 15/02 700/287 |
| 2015/0152791 A1* | 6/2015 | White | | F02C 9/26 60/773 |
| 2015/0184549 A1* | 7/2015 | Pamujula | | F01K 23/101 700/287 |
| 2015/0184550 A1* | 7/2015 | Wichmann | | F01K 13/02 700/287 |
| 2015/0185716 A1* | 7/2015 | Wichmann | | F01K 23/101 700/287 |
| 2016/0146118 A1* | 5/2016 | Wichmann | | F02C 9/50 701/100 |
| 2016/0147204 A1* | 5/2016 | Wichmann | | G05B 13/042 700/287 |
| 2016/0258361 A1* | 9/2016 | Tiwari | | F02C 9/00 |
| 2016/0258363 A1* | 9/2016 | Tiwari | | F02C 6/18 |
| 2016/0261115 A1* | 9/2016 | Asati | | H02J 3/14 |
| 2016/0281607 A1* | 9/2016 | Asati | | F02C 9/28 |
| 2017/0170764 A1* | 6/2017 | Blackwelder | | H02P 9/14 |
| 2017/0356346 A1* | 12/2017 | Jiang | | F02C 7/30 |
| 2017/0357223 A1* | 12/2017 | Jiang | | G05B 15/02 |
| 2017/0364043 A1* | 12/2017 | Ganti | | G05B 13/048 |
| 2018/0024508 A1* | 1/2018 | Piche | | G05B 13/027 |
| 2018/0024509 A1* | 1/2018 | Piche | | G05B 13/027 |
| 2018/0024512 A1* | 1/2018 | Piche | | G05B 13/0265 |
| 2018/0025288 A1* | 1/2018 | Piche | | G06N 99/005 |

* cited by examiner

SYSTEM AND METHOD FOR MODEL BASED TURBINE SHAFT POWER PREDICTOR

BACKGROUND OF THE INVENTION

The subject matter disclosed herein relates to model based control, and more specifically to model based turbine shaft power predictor control.

Several countries enforce grid frequency control requirements on gas turbine operators that specify a percentage of standard base load output that must be maintained as grid frequency drops. One way to meet such a requirement is to directly control fuel by comparing the sensed gas turbine load with the minimum required value. However, according to a power output formula that calculates the power output from the gas turbine based on rotation speed and acceleration of a gas turbine shaft, the power output from the gas turbine increases temporarily when the shaft speed decreases due to the increased load on the electrical system. It would be beneficial to improve power prediction for turbine systems.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a control system includes a processor. The processor is configured to receive signals from one or more sensors disposed in a gas turbine system, wherein the gas turbine system comprises a shaft mechanically coupled to an electric generator. The processor is further configured to predict a derived mechanical power for the shaft based on the signals. The processor is additionally configured to derive a power adjustment by executing at least one model. The processor is also configured to derive a corrected mechanical power by applying the power adjustment to the derived mechanical power; and to control the gas turbine system based on the corrected mechanical power.

In a second embodiment, a method includes receiving signals from one or more sensors disposed in a gas turbine system, wherein the gas turbine system comprises a shaft mechanically coupled to an electric generator. The method further includes predicting a derived mechanical power for the shaft based on the signals. The method also includes deriving a power adjustment by executing at least one model. The method additionally includes deriving a corrected mechanical power by applying the power adjustment to the derived mechanical power; and controlling the gas turbine system based on the corrected mechanical power.

In a third embodiment, a system includes a gas turbine. The gas turbine includes a compressor configured to compress an intake fluid into a compressed fluid, a combustor configured to combust the compressed fluid into a combustion fluid, and a turbine configured to rotatively power a shaft based on the combustion fluid, and the shaft configured to mechanically couple to an electric generator. The system also includes a control system operatively coupled to the gas turbine, the control system comprising a processor configured to receive signals from one or more sensors disposed in the gas turbine. The processor is further configured to predict a derived mechanical power for the shaft based on the signals. The processor is additionally configured to derive a power adjustment by executing at least one model. The processor is also configured to derive a corrected mechanical power by applying the power adjustment to the derived mechanical power; and to control the gas turbine based on the corrected mechanical power.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

A gas turbine's control system may operate a gas turbine at a certain level or percentage of base load, which may be defined by a country requirement or regulation as a function of grid frequency (e.g., 50 Hz, 60 Hz). The control system may then adjust fuel to a gas turbine to maintain output at the required load as grid frequency drifts below (or above) standard values, typically 50 Hz or 60 Hz. For larger industrial plants that may lack a connection to a stable electric grid, a power management system (PMS) may be employed to aid in maintaining a desired power. The PMS may include a collection of instrumentation and control devices and algorithms dedicated to maintaining a balance between the generation and consumption of electrical power within the confines of an industrial plant or electric grid. This balancing implies matching electrical power consumed by loads with mechanical power supplied to the rotating shafts of electric generators mechanically coupled to gas turbines or steam turbines.

Traditional PMS algorithms use a measurement of the electrical power output (e.g., megawatt power) of the generators to estimate the mechanical power output of generator prime movers, but this is usually valid only in steady state of operations, and may not be accurate during plant transients or disruptions in the electrical network. For example, loads such as a smelter may cause a high electrical load that may not reflect the current mechanical power. The techniques described herein include a shaft power predictor system (SPPS) which better estimates the shaft torque or mechanical power input to the generator using a model of a prime mover and the rotating shaft inertia. Measurements of generator output electrical power and speed are used to correct the predicted model-based value dynamically. By providing for the SPPS suitable for more accurately estimating the mechanical power being generated, the SPPS will enable the control system to better respond to plant upset or transient conditions, with an improved likelihood of maintaining stable operation of the plant electrical system or electric grid.

Figure 1:
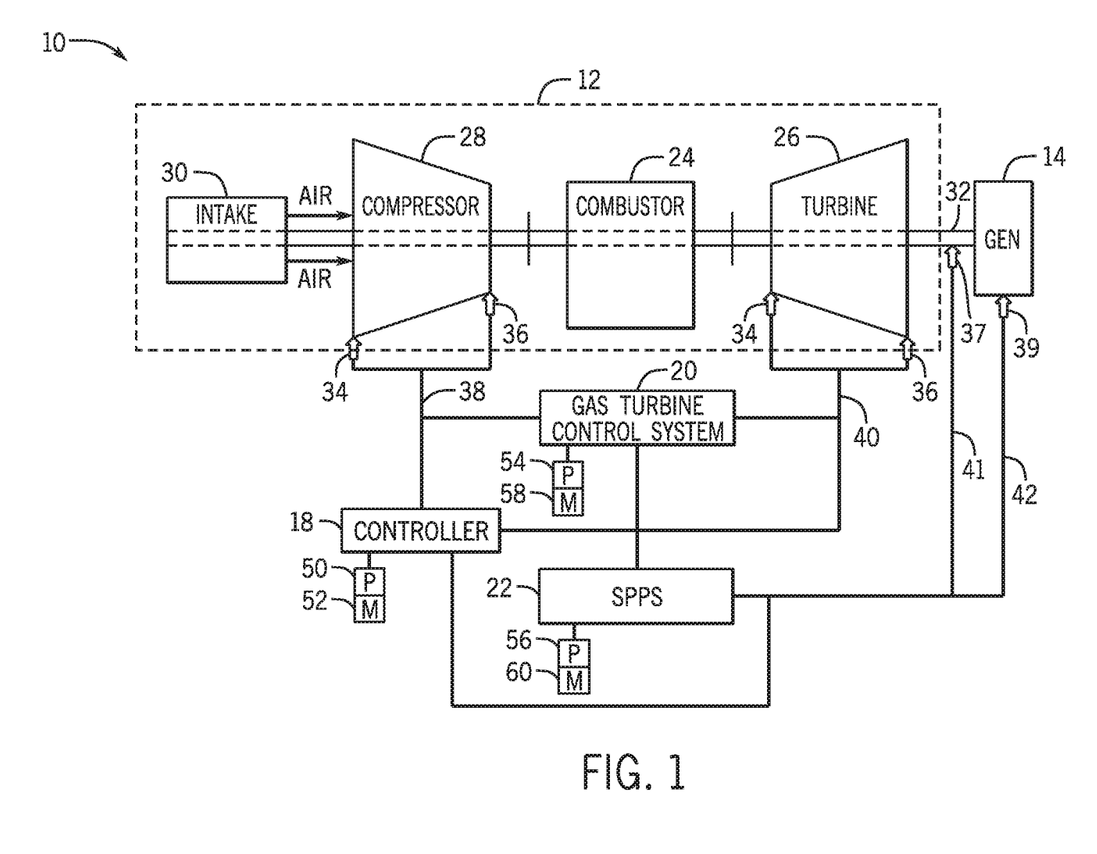
FIG. 1 is a bock diagram of an embodiment of an industrial control system suitable for model based and/or data-driven control of a gas turbine system, including a shaft power prediction system.

With the foregoing in mind, it may be useful to describe an embodiment of a power generation system incorporating techniques disclosed herein, such as a gas turbine system 10 illustrated in FIG. 1. As depicted, the system 10 may include a gas turbine 12, an electric generator 14, an after-treatment system 16, and a controller 18, and a gas turbine control system 20. Additionally, a bottoming cycle system may be connected to the gas turbine 12 in some embodiments, such as a heat recovery generator (HRSG) having one or more steam turbines. The controller 18 may be communicatively coupled via a wired or wireless connection to the gas turbine control system 20 and the generator 14. As described in detail below, a shaft power predictor system (SPPS) 22 may perform model based control and/or data-driven control to more accurately determine the mechanical power being generated by the gas turbine 12 and used, for example, to rotatively power the generator 14. It should be noted that, in some embodiments, the SPPS 22 may be included in the controller 18. In other embodiments, the SPPS 22 may be a standalone system communicatively coupled to the controller 18. In certain embodiments, the SPPS 22 may be included as part of an enhanced power management system (PMS).

The gas turbine 12 may include a combustor 24, a turbine 26, a compressor 28, and an intake 30. The combustor 24 may receive fuel that may be mixed with air, for combustion in a chamber within the combustor 24. This combustion may create hot pressurized exhaust gases. The combustor 24 may then direct the exhaust gases through the turbine 26 toward one or more exhaust outlets. Thus, the turbine 26 may be part of a rotor. As the exhaust gases pass through the turbine 26, the gases may force turbine blades to rotate a drive shaft 32 along an axis of the gas turbine 12. The drive shaft 32 may be coupled to various components of the gas turbine system 10, including not only components of the gas turbine 12, but also the generator 14. In certain embodiments, operational characteristics (e.g., pressure, temperature, flow rate, exhaust gas temperature, chemical makeup of the exhaust, etc.) may be sensed or estimated via models and used to derive power produced from the drive shaft 32, as described in more detail below.

The drive shaft 32 may include one or more shafts that may be, for example, concentrically aligned. The drive shaft 32 may include a shaft connecting the turbine 26 to the compressor 28 to form a rotor. Similarly, the compressor 28 may include blades coupled to the drive shaft 32. In embodiments, with a steam turbine (e.g., HRSG), the shaft 32 may also include steam turbine shafts concentrically disposed. Thus, rotation of turbine blades in the turbine 26 causes the shaft 32 connecting the turbine 26 to the compressor 28 to rotate blades within the compressor 28. Such a mechanism may compress air in the compressor 28. The rotation of blades in the compressor 28 may compress air that may be received via the air intake 30. The compressed air may be fed to the combustor 24 and mixed with fuel, for example, to allow for higher efficiency combustion. The gas turbine 12 may thus combust fuel and generate mechanical power to drive the generator 14 to in turn produce electrical power.

The gas turbine 12 may further include a number of sensors and field devices configured to monitor a plurality of physical and operational parameters related to the operation and performance of the power generation system 10. The sensors and field devices may include, for example, inlet sensors and field devices 34 and outlet sensors and field devices 36 (e.g., pressure transmitters, temperature transmitters, fuel analysis sensors, flow transmitters, fuel sensors, clearance sensors [e.g., measuring distances between rotating and stationary components]) positioned adjacent to, for example, the inlet and outlet portions of the turbine 26, the compressor 28, and the generator 14, respectively. Sensors and field devices may also include prime mover sensors/field devices 37 and generator sensors/field devices 39. The sensors/field devices 37 may observe shaft speed, acceleration, clearance, and so on. The sensors/field devices 30 may observe voltage, amperage, inductance, capacitance, electric power (e.g., wattage), and so on.

The inlet sensors and field devices 34 and outlet sensors and field devices 36 may additionally measure environmental conditions. For example, the inlet sensors and field devices 34 and outlet sensors and field devices 36 may measure the ambient temperature, ambient pressure, humidity, chemical makeup of exhaust gas, and air quality (e.g., particulate in air). The inlet sensors and field devices 34 and outlet sensors and field devices 36 may also monitor engine parameters related to the operation and performance of the gas turbine 12, such as, exhaust gas temperature, rotor speed, engine temperature, engine pressure, fuel temperature, engine fuel flow, exhaust flow, vibration, clearance between rotating and stationary components, compressor discharge pressure, pollution (e.g., nitrogen oxides, sulfur oxides, carbon oxides and/or particulate count), and turbine exhaust pressure. Further, the sensors and field devices 34 and 36 may also measure actuator information such as valve position, switch position, throttle position, and a geometry position of variable geometry components (e.g., air inlet).

The number of sensors and field devices 34, 36, 37, 39 may also be configured to monitor physical and operational parameters related to various operational phases of the gas turbine 12, the generator 14, and other components of the turbine system 10. Measurements taken by the number of sensors and field devices 34, 36, 37, 39 may be transmitted via data bus lines 38, 40, 41, 42, which may be communicatively coupled to the gas turbine control system 20, the controller 18, and/or the SPPS 22. As will be discussed in greater detail, the SPPS 22 may use the measurements from the sensors and field devices 34, 36, 37, 39 to derive mechanical power delivered via the shaft 32 to the generator 14. The controller 18 may use the derivations of the SPPS 22 to actively control one or more of the gas turbine system 10 (e.g., gas turbine 12 and/or the generator 14). The sensors and field devices 34, 36, 37, 39 may use a number of protocols to communicate, including but not limited to 802.15.4, Fieldbus Foundation®Profibus®, or HART® and/or WirelessHART® protocols.

As noted above, the gas turbine system 10 may include the controller 18. The controller 18 may provide an operator interface through which an engineer or technician may monitor the components of the gas turbine system 10 and/or generator 14 such as components of the gas turbine 12 and/or generator 14. Accordingly, the controller 18 may include one or more processors 50 that may be used in processing readable and executable computer instructions, and one or more memories 52 that may be used to store the readable and executable computer instructions and other data. These instructions may be encoded in programs stored in tangible non-transitory computer-readable medium such as the controller's 18 memory or other storage. In certain embodiments, the controller 18 may host various industrial control software, such as a human-machine interface (HMI) software, a manufacturing execution system (MES), a distributed control system (DCS), and/or a supervisor control and data acquisition (SCADA) system. The gas turbine control system 20 and the SPPS 22 may include similar components and software as the controller 18. For example, the gas turbine control system 20 and the after-SPPS 22 may include one or more processors 54, 56 respectively, that execute computer instructions stored in one or more memories 58, 60.

Figure 2:
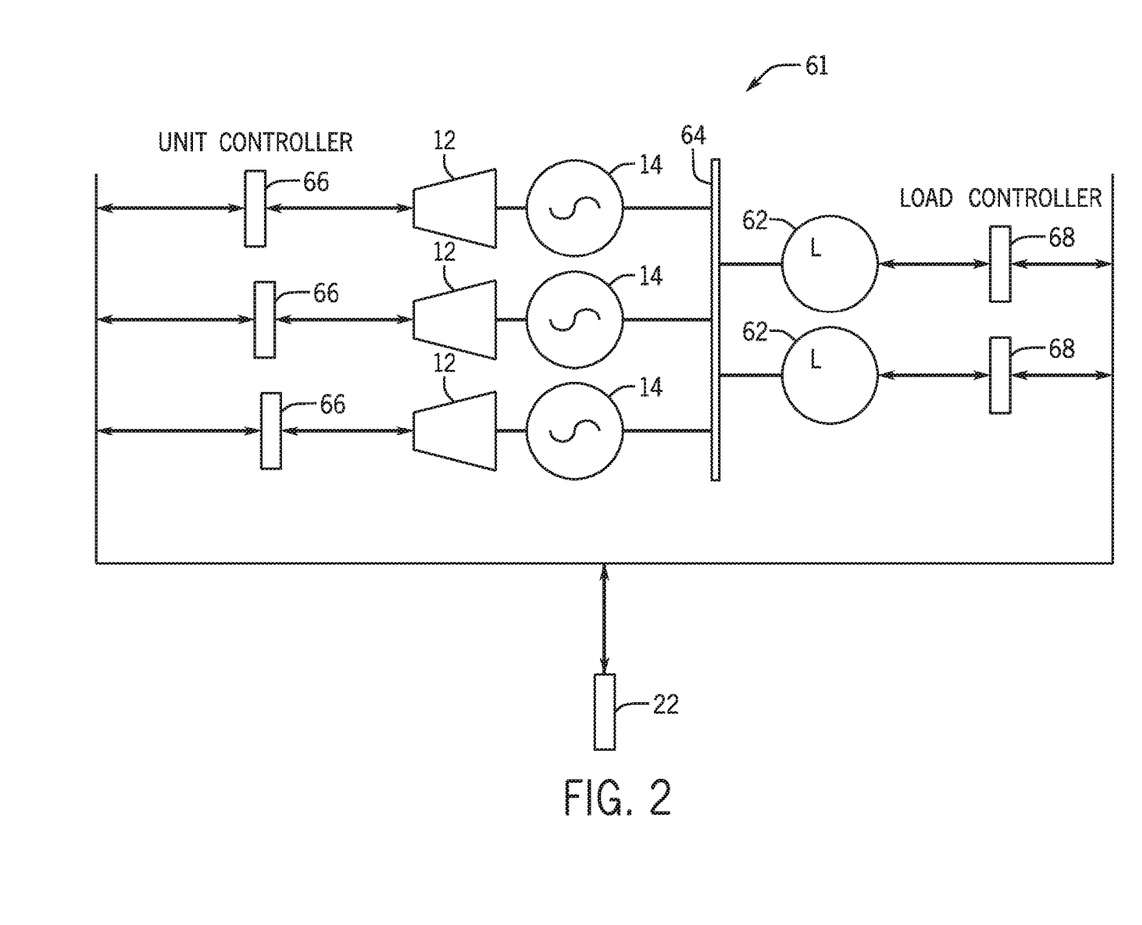
FIG. 2 is a block diagram of an embodiment of multiple power generation system that may be controlled by the industrial control system of FIG. 1.

The SPPS 22 may be communicatively coupled to multiple gas turbine systems 12 and generators 14, as shown in FIG. 2. More specifically, the figure illustrates an embodiment of an industrial plant 61 having the SPPS 22 communicatively coupled to three turbine systems 12, each system 12 in turn mechanically coupled to a generator 14. Electrical power produced by the generators 14 may then be distributed to loads 62. For example, a transmission system 64 may be used to transmit the electrical power to the loads 62.

In the depicted embodiment, unit controllers 66 may be used to control each individual gas turbine system 12 and/or generators 14. Load controllers 68 may be used to control the loads 62, for example, to control power delivered to the loads 62, voltage, amperage, and so on. The unit controllers 66 and load controllers 68 may be included in the control system 20, and/or may be included in the controller 18. In certain embodiments, the controller 18 may be the unit controller 66. During operations, the SPPS 22 may monitor the gas turbine system 12, the generator 14, the transmission system 64, and/or the loads 62 to derive a more accurate computation for the mechanical power supplied to the generators 14. The SPPS 22 may act quickly in the event of the sudden loss of either power generation or load in order to prevent excessive deviations in the electrical system frequency or voltage, or both. Such deviations may result in activation of protective systems, which shutdown the systems depicted. A more accurate estimation of the mechanical power being generated will allow the SPPS 22 to better respond to plant upset or transient conditions, with a better likelihood of maintaining stable operation of the plant 61. Certain models and process, as described below with respect to FIG. 3, may be executed by the SPPS 22 in real-time to more accurately estimate the mechanical power being generated.

Figure 3:
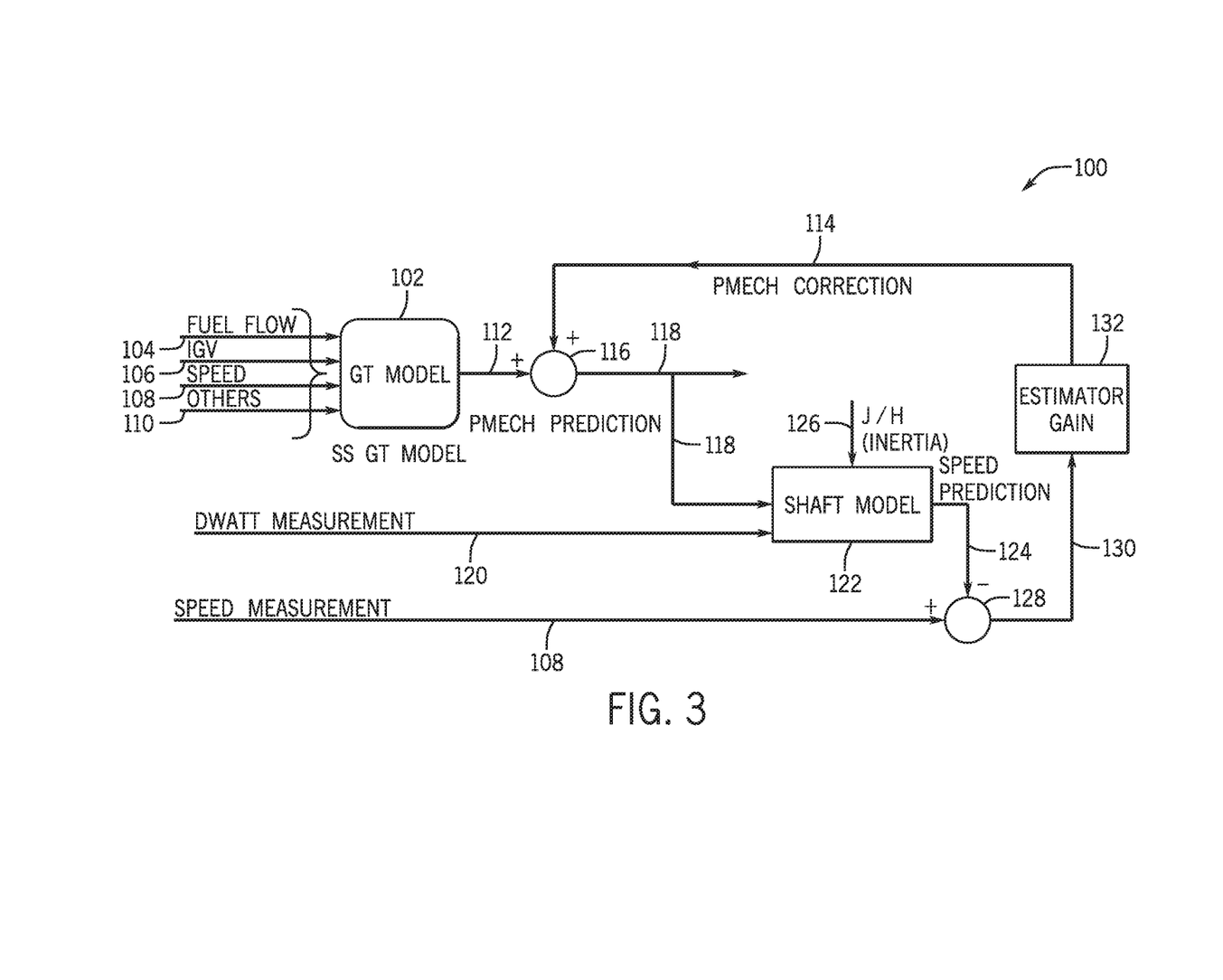
FIG. 3 is an information flow diagram of model-based control embodiments for the shaft power prediction system show in FIGS. 1 and 2.

Turning now to FIG. 3, the figure is an information flow diagram of an embodiment of a process 100 suitable for more accurately deriving a mechanical power being delivered to generator(s) 14. More specifically, the process 100 may derive an instantaneous power provided by the shaft 32 that does not include any inertia component. By deriving a more accurate mechanical power delivered by the gas turbine system 12 (including any steam turbine component), the techniques described herein may more effectively handle transient conditions. The process 100 may be implemented as computer code or instructions executable by the processors 50, 54, and/or 56 and stored in the memories 52, 58, and/or 60.

In the depicted embodiment, the process 100 may execute a gas turbine model 102. The gas turbine model 102 may receive as input various turbine system 10 properties, such as fuel flow 104, inlet guide vane (IGV) position 106, turbine speed (e.g., RPM, frequency) 108, and other parameters 110. The other parameters 110 may include turbine pressure, exhaust temperature, fuel type, number of fired hours, and so on. The model 102 may include a variety of submodels suitable for providing derivations and/or control (e.g., model based control [MBC]) of the turbine system 10. For example, the model(s) 102 include physics-based models, such as such as thermodynamic models, fluid models, low cycle fatigue (LCF) life prediction models, computational fluid dynamics (CFD) models, finite element analysis (FEA) models, solid models (e.g., parametric and non-parametric modeling), and/or 3-dimension to 2-dimension FEA mapping models. Model(s) 102 may also include artificial intelligence (AI) models, such as expert systems (e.g. forward chained expert systems, backward chained expert systems), neural networks, fuzzy logic systems, state vector machines (SVMs), inductive reasoning systems, machine learning systems, Bayesian inference systems, or a combination thereof.

The model(s) 102 may be used to derive temperatures, pressures, speeds (e.g., rotative speeds), fluid flows, mass flows, species concentration (e.g., chemical composition of fluids), and/or clearances (e.g., distances between stationary and moving components) related to the turbine system 10. The model(s) 102 may also include statistical models, such as regression analysis models, data mining models (e.g., clustering models, classification models, association models), and the like. For example, clustering techniques may discover groups or structures in the data that are in some way "similar."

In the depicted embodiment, the gas turbine model 102 uses the inputs 104-110 to compute or derive a mechanical power 112. While the derived mechanical power 112 does not include an inertia component, the derived mechanical power 112 may not be as accurate as desired. Accordingly, a correction factor 114 is applied at block 116 to more accurately derive a corrected mechanical power prediction 118.

The corrected mechanical power prediction 118 may be applied, for example by the controller 18, to more accurately control the gas turbine system 12. For example, when the gas turbine system 12 is connected to the loads 62, e.g., via the transmission system 64 or electricity grid, the rotational speed of the shaft 32 corresponds to the frequency of the transmission system 64 or electricity grid (e.g., 50 Hz, 60 Hz). When power drops on the transmission system 64, the transmission system 64 may causes the shaft 32 to decrease in rotation speed, even when the fuel input (e.g., input 104) from a fuel supply to the combustor 24 has not changed.

Based on the change in power output, when the shaft 32 decelerates, for example the shaft 32 acceleration may become negative, the gas turbine power output increases temporarily around a time that the shaft 32 first begins to decelerate. The increase in the power output level, before the techniques described herein, may have caused the controller 18 to maintain or decrease a fuel supplied to the combustor 24, since the controller 18 detects that the power output level to the transmission system 64 grid is above the base power output level. Although the power output level is technically above the required power output level, a decrease in fuel supplied to the combustor 24 results in a decrease in the gas turbine torque, such that when the frequency of the transmission system 64 or electricity grid stabilizes and the acceleration of the shaft 32 returns to zero, the gas turbine system 12 generates an output less than the power output level required to satisfy, for example, grid code governmental requirements. By providing a more accurate, corrected mechanical power prediction 118, the controller 18 may improve the adjustment of the fuel supplied to the combustor 24. Thus, when the frequency of the transmission system 64 or electricity grid stabilizes, the gas turbine system 12 generates an improved power output level that may better satisfy grid code governmental requirements.

To provide for the correction factor 114, the process 100 may use a Dwatt measurement 120, such as the instantaneous electrical power (e.g., in Watts) being provided by the generator 14, in conjunction with the speed measurement 108 and the previously corrected mechanical power prediction 118 (e.g., as feedback), as input to a shaft model 122. The shaft model 122 may then be used to derive a predicted shaft speed 124. More specifically, the shaft model 122 may use Newton's law for rotating components to derive the predicted shaft speed 124. Inertia 126 (e.g., J/H) may be calculated by using J as a polar moment of inertia and H where H is an inertia constant. J may be calculated using moment of inertia formulas, such as $J_{solid} = \Pi * R^4 / 2$ for a solid shaft, where R is the radius of the shaft. H may be calculated, for example, based on the energy stored in the rotating mass of the shaft 32 (e.g., kWsec) divided by the volt-ampere (VA) rating of the generator 14. For example, H=kWsec/=kVA. Another way to derive H is $H = (2 * J * \omega^2) / (S * p^2)$ seconds where $\omega$ is the synchronous speed, S is the VA rating of the generator 14, and p is the number of poles of the generator 14. The equations described may then be used to derive the predicted shaft speed 124. For example, speed may be the integral of acceleration of the shaft 32.

The process 100 may then, at block 128, find a difference 130 between the speed prediction 124 and the speed measurement 108. The difference 130 may be gain estimated (via block 132) to derive the correction factor 114. As mentioned earlier, the correction factor 114 may then be applied to derive the corrected mechanical power prediction 118, which may be used to more accurately control the gas turbine 12.

Figure 4:
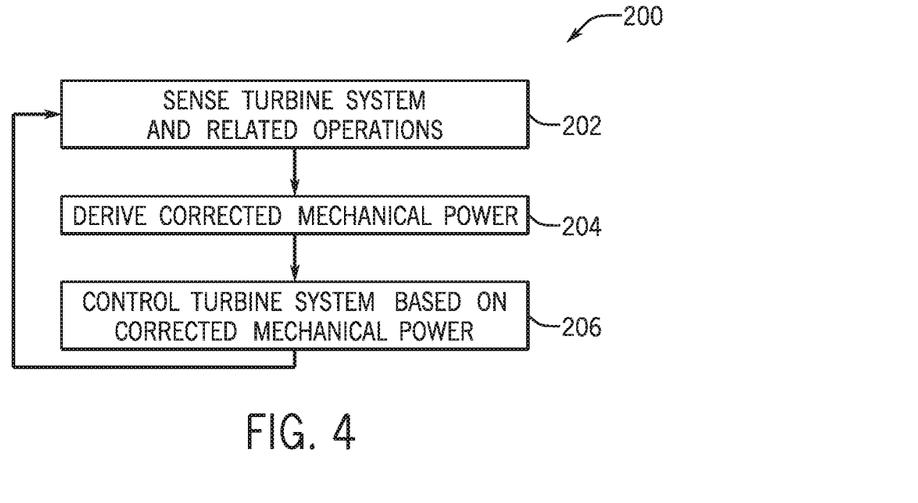
FIG. 4 is a flowchart illustrating an embodiment of a process suitable for providing for more accurate mechanical power predictions and for controlling the gas turbine system of FIG. 1.

FIG. 4 is a flowchart illustrating an embodiment of a process 200 suitable for providing for the accurate mechanical power predictions 118 and for controlling the gas turbine system 10. The process 200 may be implemented as computer code or instructions executable by the processors 50, 54, and/or 56 and stored in the memories 52, 58, and/or 60. In the depicted embodiment, the process 200 may sense (block 202) turbine system 10 and related operations, such as operations of the plant 61, including operations of the generators 14, loads 62, transmission system 64, and so on. The sensed operations may result in a variety of measurements, such as the inputs 104-110, and the Dwatt measurement 120. Indeed, a variety of operations may be measured via sensors and field devices 34, 36, 37, 39, including flows, pressures, temperatures, clearances, voltages, amperages, electric power, and so on.

The process 200 may then derive (block 204) the corrected mechanical power 118, for example, by using the gas turbine model 102, the shaft model 122, and the estimator gain 132 described in the previous figure. As mentioned with respect to the process 100, the correction factor 114 may be derived and applied to the predicted mechanical power 112 to compute the corrected mechanical power 118 based on them models 102, 122, and the estimator gain 132. The process 200 may then control (block 206) the turbine system 10 based on the corrected mechanical power 118. For example, fuel flow may be adjusted, IGV positions may be adjusted, and so on. By providing for a more accurate mechanical power 118, the techniques described herein may more easily maintain stable operations even during transient conditions.

Technical effects of the invention include deriving, via a turbine system model, a mechanical power produced by a shaft, wherein the shaft is mechanically coupled to an electric generator. The mechanical power is then corrected by application of a correction factor. The correction factor is derived via an estimator gain and a shaft model that uses as input the instantaneous electrical power being provided by an electric generator, in conjunction with a speed measurement of the gas turbine and the previously corrected mechanical power prediction. The corrected mechanical power prediction may then be used to control the turbine system, for example, in real time, for improved operational stability.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A control system, comprising:
a processor, wherein the processor is configured to:
receive signals from one or more sensors disposed in a gas turbine system, wherein the gas turbine system comprises a shaft mechanically coupled to an electric generator;
predict a derived mechanical power for the shaft based on the signals;
derive a power adjustment by executing at least one model;
derive a corrected mechanical power by applying the power adjustment to the derived mechanical power; and
control the gas turbine system based on the corrected mechanical power, wherein the processor is configured to predict the derived mechanical power by executing a turbine model using the signals as input to the turbine model, wherein the processor is configured to derive the power adjustment by executing the turbine model to predict the derived mechanical power and to provide the derived mechanical power as input to a shaft model, wherein the shaft model derives a speed prediction for the shaft based on the derived mechanical power and on an instantaneous wattage measurement of electrical power produced by the electric generator.

2. The system of claim 1, wherein the turbine model comprises a thermodynamic model, a fluid model, a low cycle fatigue (LCF) life prediction model, a computational fluid dynamics (CFD) model, a finite element analysis (FEA) model, a solid model a 3-dimension to 2-dimension FEA mapping model, or a combination thereof.

3. The system of claim 1, wherein the turbine model comprises a physics-based model of the gas turbine system, the gas turbine system comprising a compressor configured to compress an intake fluid into a compressed fluid, a combustor configured to combust the compressed fluid into a combustion fluid, and a turbine configured to rotatively power the shaft based on the combustion fluid.

4. The system of claim 3, wherein the signals comprise a fuel flow signal, an inlet guide vane position signal, a turbine speed signal, or a combination thereof.

5. The system of claim 1, wherein the processor is configured to:
derive a difference between the speed prediction and a speed measurement of the shaft; and
derive the power adjustment by applying an estimator gain to the difference.

6. A method of controlling a gas turbine system connected to an electrical grid, comprising:
receiving signals from one or more sensors disposed in a gas turbine system, wherein the gas turbine system comprises a shaft mechanically coupled to an electric generator;
predicting a derived mechanical power for the shaft based on the signals;
deriving a power adjustment by executing at least one model;
deriving a corrected mechanical power by applying the power adjustment to the derived mechanical power; and
controlling the gas turbine system based on the corrected mechanical power, wherein predicting the derived mechanical power comprises executing a turbine model using the signals as input to the turbine model, wherein executing the turbine model to predict the derived mechanical power comprises providing the derived mechanical power as input to a shaft model, wherein the shaft model derives a speed prediction for the shaft based on the derived mechanical power and on an instantaneous wattage measurement of electrical power produced by the electric generator.

7. The method of claim 6, wherein the turbine model comprises a thermodynamic model, a fluid model, a low cycle fatigue (LCF) life prediction model, a computational fluid dynamics (CFD) model, a finite element analysis (FEA) model, a solid model a 3-dimension to 2-dimension FEA mapping model, or a combination thereof.

8. The method of claim 6, wherein the turbine model comprises a physics-based model of the gas turbine system, the gas turbine system comprising a compressor configured to compress an intake fluid into a compressed fluid, a combustor configured to combust the compressed fluid into a combustion fluid, and a turbine configured to rotatively power the shaft based on the combustion fluid.

9. The method of claim 8, wherein the signals comprise a fuel flow signal, an inlet guide vane position signal, a turbine speed signal, or a combination thereof.

10. The method of claim 6, comprising:
deriving a difference between the speed prediction and a speed measurement of the shaft; and
deriving the power adjustment by applying an estimator gain to the difference.

11. The method of claim 6, wherein deriving the power adjustment, deriving the corrected mechanical power, and controlling the gas turbine system occurs in real-time.

12. The method of claim 11, wherien deriving the power adjustment, deriving the corrected mechanical power, and controlling the gas turbine system occurs during a transient event of the electric grid.

13. A system, comprising:
a gas turbine, comprising a compressor configured to compress an intake fluid into a compressed fluid, a combustor configured to combust the compressed fluid into a combustion fluid, and a turbine configured to rotatively power a shaft based on the combustion fluid, and the shaft configured to mechanically couple to an electric generator; and
a control system operatively coupled to the gas turbine, the control system comprising a processor configured to:
receive signals from one or more sensors disposed in the gas turbine;
predict a derived mechanical power for the shaft based on the signals;
derive a power adjustment by executing at least one model; derive a corrected mechanical power by applying the power adjustment to the derived mechanical power; and
control the gas turbine based on the corrected mechanical power, wherein the processor is configured to predict the derived mechanical power by executing a turbine model using the signals as input to the turbine model, wherein the processor is configured to derive the power adjustment by executing the turbine model to predict the derived mechanical power and to provide the derived mechanical power as input to a shaft model, wherein the shaft model derives a speed prediction for the shaft based on the derived mechanical power and on an instantaneous wattage measurement of electrical power produced by the electric generator.

14. The system of claim 13, wherein the turbine model comprises a thermodynamic model, a fluid model, a low cycle fatigue (LCF) life prediction model, a computational fluid dynamics (CFD) model, a finite element analysis (FEA) model, a solid model a 3-dimension to 2-dimension FEA mapping model, or a combination thereof.

15. The system of claim 13, wherein the turbine model comprises a physics-based model of the gas turbine system, the gas turbine system comprising a compressor configured to compress an intake fluid into a compressed fluid, a combustor configured to combust the compressed fluid into a combustion fluid, and a turbine configured to rotatively power the shaft based on the combustion fluid.

16. The system of claim 13, wherein the processor is configured to:
derive a difference between the speed prediction and a speed measurement of the shaft; and
derive the power adjustment by applying an estimator gain to the difference.

17. The system of claim 13, wherein the processor is configured to control the gas turbine based on the corrected mechanical power by adjusting a fuel flow, an inlet guide vane position, or a combination thereof.

* * * * *